(12) United States Patent
Fazio et al.

(10) Patent No.: US 11,704,644 B2
(45) Date of Patent: Jul. 18, 2023

(54) CARWASH QUEUE MANAGEMENT SYSTEM WITH LICENSE PLATE RECOGNITION AND METHOD OF OPERATING THE CARWASH QUEUE MANAGEMENT SYSTEM

(71) Applicant: SONNY'S ENTERPRISES, INC., Tamarac, FL (US)

(72) Inventors: Paul Fazio, Plantation, FL (US); Anthony Analetto, Weston, FL (US); Reginald Flanagan, Pompano Beach, FL (US)

(73) Assignee: Sonny's Enterprises, LLC, Tamarac, FL (US)

( * ) Notice: Subject to any disclaimer, the term of this patent is extended or adjusted under 35 U.S.C. 154(b) by 184 days.

(21) Appl. No.: 17/083,949

(22) Filed: Oct. 29, 2020

(65) Prior Publication Data

US 2021/0150499 A1 May 20, 2021

Related U.S. Application Data

(60) Provisional application No. 62/937,859, filed on Nov. 20, 2019.

(51) Int. Cl.
| | | |
|---|---|---|
| *G06Q 20/00* | (2012.01) | |
| *G06Q 20/20* | (2012.01) | |
| *H04N 7/18* | (2006.01) | |
| *G06Q 20/04* | (2012.01) | |
| *B60S 3/04* | (2006.01) | |
| *B60S 3/00* | (2006.01) | |
| *G06Q 10/20* | (2023.01) | |
| *G06V 20/62* | (2022.01) | |
| *G07C 11/00* | (2006.01) | |

(52) U.S. Cl.
CPC ............ *G06Q 20/202* (2013.01); *B60S 3/002* (2013.01); *B60S 3/04* (2013.01); *G06Q 10/20* (2013.01); *G06Q 20/045* (2013.01); *G06V 20/62* (2022.01); *H04N 7/183* (2013.01); *G06V 20/625* (2022.01); *G07C 2011/04* (2013.01)

(58) Field of Classification Search
CPC .............................. G06Q 20/202; B60S 3/002
See application file for complete search history.

(56) References Cited

U.S. PATENT DOCUMENTS

| | | | | |
|---|---|---|---|---|
| 8,049,643 B2 * | 11/2011 | Ness | .................... | G08G 1/0175 |
| | | | | 701/1 |
| 2012/0263352 A1 * | 10/2012 | Fan | ..................... | G06V 10/255 |
| | | | | 382/105 |

* cited by examiner

*Primary Examiner* — Rokib Masud
(74) *Attorney, Agent, or Firm* — Laurence A. Greenberg; Werner H. Stemer; Ralph E. Locher

(57) ABSTRACT

A method of operating a carwash includes driving a vehicle to a point of sale station of the carwash, purchasing a carwash transaction, and taking a first picture of a license plate number of the vehicle after the completion of the purchase of the carwash transaction at the point of sale station. The license plate number is associated with the carwash transaction as a carwash ticket. The vehicle is then sent to a carwash queue disposed downstream of the point of sale station. The carwash ticket information is sent to a carwash tunnel. A second picture of the license plate number of the vehicle is taken right as it approaches the carwash tunnel. The license plate number is associated with the carwash ticket and the vehicle is washed according to a wash dictated by the carwash ticket.

14 Claims, 3 Drawing Sheets

CARWASH QUEUE MANAGEMENT SYSTEM WITH LICENSE PLATE RECOGNITION AND METHOD OF OPERATING THE CARWASH QUEUE MANAGEMENT SYSTEM

CROSS-REFERENCE TO RELATED APPLICATION

This application claims the priority, under 35 U.S.C. § 119, of U.S. patent No. 62/937,859, filed Nov. 20, 2019; the prior application is herewith incorporated by reference in its entirety.

BACKGROUND OF THE INVENTION

Field of the Invention

The invention relates to automated carwashes and the ability to detect and monitor a vehicle that is traversing the carwash into a carwash tunnel.

Automatic carwashes are configured to process as many vehicles as possible in a given period of time. One goal of these car washes is to maintain a constant flow of vehicles through the carwash and to properly queue the cars before they enter the carwash tunnel. Some vehicle washing service stations provide one washing selection input station and subsequently the customer drives the vehicle forward to the vehicle washing tunnel. In this carwash, vehicles enter one at a time into the washing tunnel and the vehicles maintain a single file line.

Other vehicle washes have multiple pay points with multiple vehicle washing selection services available. After the customers enter their selections and pay for the selections at one of the multiple pay point systems, the vehicles typically exit the selection and pay area and enter a queue point area where they wait for entry into one of a plurality of wash tunnels.

When a customer purchases a vehicle washing service, a problem can arise if the vehicle washing tunnel does not receive the proper service selection that the customer ordered (e.g. the type of wash). A current solution to this problem, as generally known in the art, is to allow for one vehicle to pull forward from the pay point to a single file queue point. Once the vehicle reaches the single file queue, another vehicle can be released from the pay area gate. In this way the system can provide the correct wash to the correct vehicle as opposed to confusing the identification of the vehicles and their respective washing selections.

Another problem associated with both of those vehicle washing systems is that there is a relatively high risk of not having a vehicle to wash when there is an open spot in the wash tunnel for a vehicle. This could happen if a vehicle does not immediately exit the vehicle washing selection input area and travel directly to the line for the vehicle washing tunnels. Accordingly, if the vehicles do not enter the line directly following their service selection, the timing of the service selection arriving at the vehicle washing tunnel and the vehicle arriving at the vehicle washing tunnel may be off. Consequently, the vehicle may receive another customer's wash selection.

Additionally, it is important for efficiency purposes to have a vehicle in the wash tunnel(s) at all times (e.g. a buildup of vehicles at the entry gate). If there is no vehicle in the wash tunnel, the overall efficiency of the vehicle carwash is decreased and the carwash can lose potential revenue. Furthermore, if a customer runs into a problem, for example, if the customer is putting a wallet away, waiting for a receipt to print, or any number of other things that could happen at the pay point, on a busy day efficiency is decreased as a whole as the vehicle is holding up the line and preventing a smooth flow of vehicles to the vehicle washing tunnel. In some high-volume vehicle washes, efficiency is particularly important in that a small amount of time savings can lead to more vehicles entering the carwash. For example, some carwashes have vehicles enter at as high of a rate as one vehicle every approximately fifteen seconds. A decrease in the amount of time between vehicles leads to an increase in efficiency and an increase in profitability of the vehicle carwash.

To solve this problem, some vehicle carwash designs have a multiple gate and pay area solution in which there are multiple pay stalls for multiple vehicles to pay for vehicle washes. After making a vehicle wash selection and paying for the selection, the vehicles move through a gate towards the vehicle wash equipment and tunnel. A problem associated with this is determining to which vehicle a customer's vehicle washing service selection is associated. Many vehicle carwash designs have attempted to solve this by using employees to input the vehicle selection service as the vehicle reaches the vehicle washing tunnel. Additionally, the carwashes will mark a vehicle and then an operator in the tunnel entrance manually enters the vehicle number, picks a service, or uses some other mechanism to tell the carwash tunnel which service or services to provide. The problem with this situation is that it requires a person, as an employee, to perform the task and thus increases the likelihood of error, fraud, or failure to provide the correct services each customer paid for. In addition, there are costs associated with the additional employee(s).

Another potential difficulty with these vehicle carwashes is that multiple people are attempting to get into a vehicle washing tunnel that has only one access point. This can lead to multiple vehicle bottlenecks that can frustrate customers when they cannot immediately get into the vehicle wash tunnel. In turn, this can lead to decreased customer retention rates as customers may choose to go to a different carwash if they become frustrated with the current carwash.

Automated carwash systems today rely on vehicle recognition systems for distinguishing vehicle types based on a plurality of points on a vehicle, see U.S. Pat. No. 8,049,634 to Ness. These include such features as vehicle size (e.g. height, width, surface area), shape, distinguishing features (e.g. mirrors, bumpers), color, etc. However, if two of the same vehicle types or highly similar vehicles enter the carwash the vehicle recognition system can be confused as it cannot distinguish the vehicles from each other. In addition, these vehicle tracking systems continuously track the vehicle from entry to exit which requires a plurality of tracking sensor placed throughout the vehicle wash queue area.

Other carwashes solve these vehicle queue problems by adding a barcode attached to the outside surface of the vehicle in which the barcode is read as the customer enters the carwash tunnel. The barcode contains the wash information purchased by the customer. This requires an employee to attach the bar code to the vehicle as customers cannot be relied on to self-attach such a barcode as they are not aware of the procedure or do not properly attach the barcode. Furthermore, there are costs associates with producing the barcode and providing an employee to attach and remove the barcode when the carwash process is complete.

There is an overall need to have a reliable car tracking system that is cost effective.

SUMMARY OF THE INVENTION

It is accordingly an object of the invention to provide a carwash queue management system having license plate recognition and a method of operating the carwash queue management system that overcome the above-mentioned disadvantages of the prior art devices and methods of this general type, which is technically easy to implement with inexpensive components and is operationally more effective than existing systems.

With the foregoing and other objects in view there is provided, in accordance with the invention, a carwash containing a point of sale station to be used by a carwash customer for purchasing a carwash transaction relating to a selected vehicle wash. A first camera is disposed upstream of the point of sale station for reading a license plate number of a vehicle. The first camera is connected to the point of sale station and the license plate number is associated with the carwash transaction. A carwash tunnel is disposed downstream of the first camera and is connected to the point of sale station and/or the first camera and receives the license plate number and the carwash transaction. A second camera is disposed upstream of the carwash tunnel. The second camera reads the license plate number of the vehicle and forwards the license plate number to the carwash tunnel. The carwash tunnel associates the license plate number taken by the second camera with the carwash transaction purchased and washes the vehicle based on the carwash transaction.

Because the license plate number is used to identify all vehicles entering the carwash tunnel, all vehicles are properly and quickly identified which ensures that the vehicle receives the wash ordered by the customer.

In accordance with an added feature of the invention, a vehicle queue is disposed between the point of sale station and the carwash tunnel. The vehicle enters the vehicle queue after completing a transaction at the point of sale station. The vehicle proceeds in the vehicle queue in an untracked manner and is only tracked at an end of the vehicle queue in a region of an entrance to the carwash tunnel by the second camera. Because the vehicle is not tracked in the vehicle queue, no tracking equipment is needed and no processing time and expense is wasted on tracking vehicles.

In accordance with an additional feature of the invention, the point of sale station is one of a plurality of point of sale stations. As a simple tracking system is involved, it can easily work with a plurality of point of sale stations.

In accordance with a further feature of the invention, the carwash tunnel has a controller connected to the second camera and to the point of sales station and/or the first camera. The controller receives the carwash transaction and the license plate number from the point of sale station and/or the first camera. The controller further receives the license plate number from the second camera. The controller configures a washing queue of the carwash tunnel based on the license plate number and the carwash transaction. In this manner, the carwash tunnel is set up to handle various types of vehicles requiring various types of washes.

In accordance with yet another feature of the invention, the first camera and the second camera each store license plate recognition software and identify license plates of imaged vehicles.

In accordance with a further added feature of the invention, the carwash tunnel has a presoak station, a washing station and a drying station. Parameters of the presoak station, the washing station and the drying station are set based on the carwash transaction as that the presoak station, the washing station and the drying station can wash the vehicle in a customized fashion and as requested by the customer.

With the foregoing and other objects in view there is further provided, in accordance with the invention a method of operating a carwash. The method includes driving a vehicle to a point of sale station of the carwash and purchasing a carwash transaction relating to selected carwash services at the point of sale station. A first image is taken of a license plate number of the vehicle during the purchasing of the carwash transaction at the point of sale station. The license plate number and the carwash transaction are sent to a carwash tunnel. The license plate number with the carwash transaction are combined to form a carwash ticket in the carwash tunnel or at the point of sale station. The vehicle is sent to a vehicle queue disposed downstream of the point of sale station. A second image of the license plate number of the vehicle is taken as the vehicle approaches an entrance to the carwash tunnel. The license plate number in the second image is associated with the carwash ticket and the vehicle is washed according to a wash dictated by the carwash ticket.

With the foregoing and other objects in view there is further provided, in accordance with the invention a method of operating a carwash. The method includes driving a vehicle to one of a plurality of point of sale stations of the carwash and purchasing a carwash transaction relating to selected carwash services at the one point of sale station. A first image of a license plate number of the vehicle is taken during the purchasing of the carwash transaction at the one point of sale station. The license plate number is associated with the carwash transaction as a carwash ticket. The license plate number and the carwash transaction are sent to a plurality of carwash tunnels. The vehicle is sent to a vehicle queue disposed downstream of the one point of sale station. A second image of the license plate number of the vehicle is taken as the vehicle approaches an entrance to one of the carwash tunnels. The license plate number taken from the second image is associated with the carwash ticket and the vehicle is washed according to a wash dictated by the carwash ticket in the one carwash tunnel.

In accordance with a further mode of the invention, the carwash service purchased is displayed in a visual manner in the carwash tunnel to a customer entering the carwash tunnel.

Accordingly, it is an object to provide a system in which vehicles can enter a vehicle wash in any order and do not have to comply with a specific sequence, thus increasing efficiency.

Accordingly, another object is to provide a system that is fully automated to prevent human error and increase efficiency.

A further object of the invention is to provide a vehicle tracking system that automatically pairs the vehicle with the vehicle washing selection choice in order to increase the number of vehicles that can be washed in a given amount of time by decreasing the number of vacant vehicle washing tunnels and vehicles waiting in line.

Other features which are considered as characteristic for the invention are set forth in the appended claims.

Although the invention is illustrated and described herein as embodied in a carwash queue management system with license plate recognition and a method of operating the carwash queue management system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
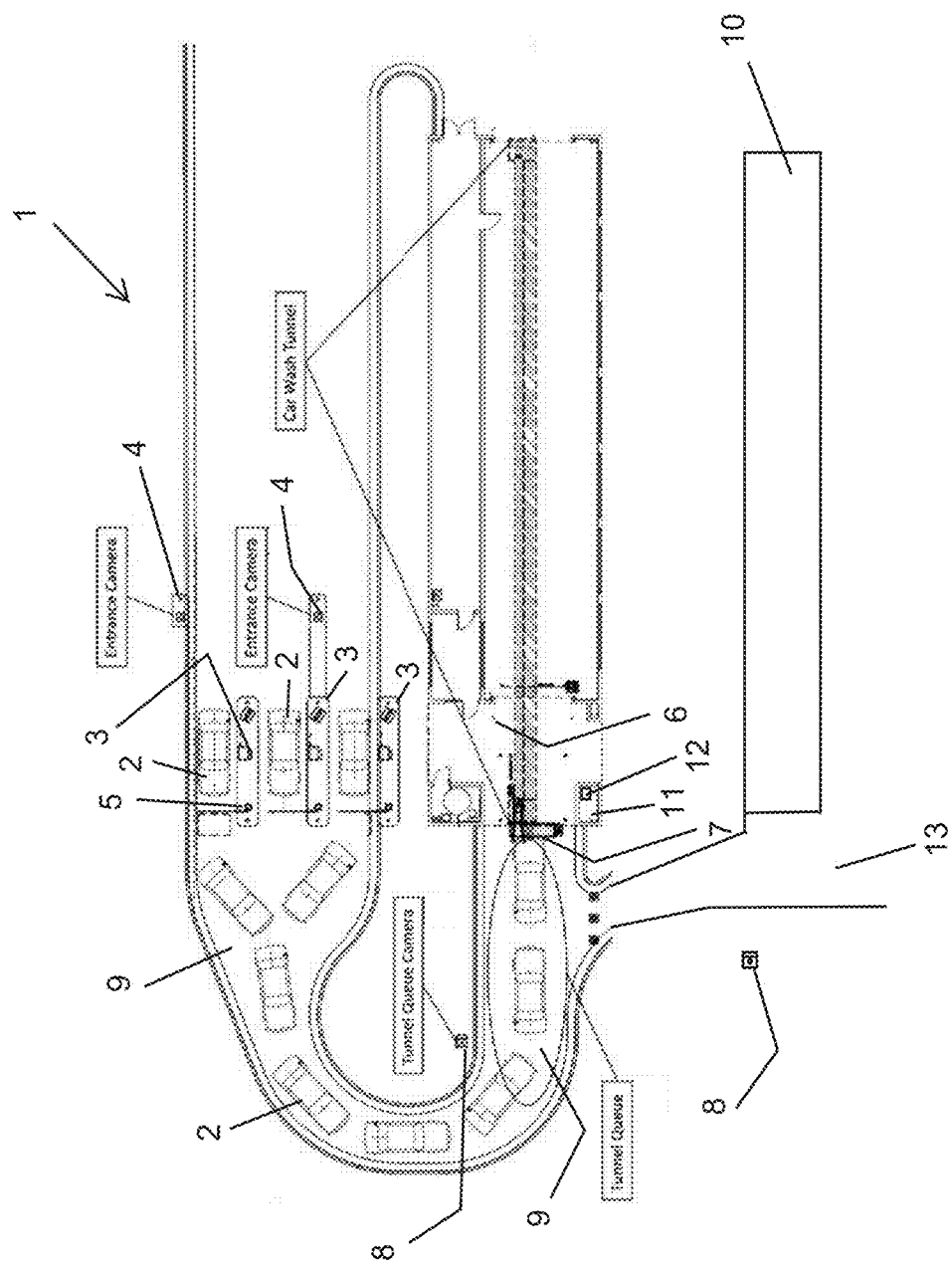
FIG. 1 is an illustration of a carwash with an entry point with multiple pay stations leading to a carwash tunnel and a tunnel queue camera for reading a license plate according to the invention.

Referring now to the figures of the drawings in detail and first, particularly to FIG. 1 thereof, there is shown an automated carwash 1. As a vehicle 2 approaches the automated car wash 1, the vehicle 2 stops at a point of sale station or kiosk 3 where the customer enters desired carwash information and pays for his\her carwash. After the customer makes a purchase or wash redemption at a point of sale station 3, the vehicle's license plate number is processed and attached to a transaction upon purchase or redemption. The vehicle license plate number is processed by an entrance camera 4 associated with the point of sale station 3 (e.g. the license plate number is now associated with the desired carwash service that was purchased at the point of sale station 3). More specifically, the camera 4 which resides outside of the point of sale station 3 has a live feed, takes still images and has onboard or external technology that recognizes license plates number. The license plate number and the associated purchased wash information are then sent to a controller 11 of a carwash tunnel 6.

After the purchase, an entry gate 5 is lifted and the vehicle 2 drives into a physical vehicle queue 9 disposed between the point of sale station 3 and a downstream carwash tunnel 6. The physical vehicle queue 9 is sequential, namely the first vehicle in is the first vehicle out. However, the vehicles can get out of order causing the possibility that the vehicles 2 get the wrong carwash. For instance, a vehicle may leave the carwash via a bypass 13 and not enter the carwash tunnel 6. In general, the vehicles 2 are funneled into a single file line with the vehicle 2 in the front entering the carwash tunnel 6 and receiving the next wash that is in a carwash queue of the controller 11 of the carwash tunnel 6. There may or may not be any gates present to assist in keeping vehicles 2 in the proper order.

As the vehicle 2 travels to an entrance 7 of the carwash tunnel 6, a tunnel camera 8 will collect the image of the license plate once again, process the numbers and letters in the image with onboard and/or external license plate recognition technology, then reorder the carwash queue based on the license plate number so that it is ensured that each vehicle 2 in line gets the correct wash. The lanes and number of carwash tunnels 6 at the car wash location 1 may vary. However, as each vehicle 2 is about to enter a carwash tunnel 6, its license plate is read and the wash information is transferred to the controller 11 of the carwash tunnel 6 which sets the proper wash settings. Therefore, multiple vehicle queues 9 and multiple carwash tunnels 6 may be in operation at any given point and since the license plate dictates the wash formula (e.g. services), all vehicles 2 are properly washed with this simple method. In essence, the cameras 4, 8, the carwash controller 11 and the point of sale station 3 form a vehicle tracking system that automatically pairs the vehicle 2 with the vehicle washing selection choices. This automatic pairing of the vehicle 2 with the transaction information increases the number of vehicles 2 that can be washed in a given period of time by decreasing the number of vacant vehicle wash tunnels 6 and the number of vehicles 2 waiting in line.

At this time we note that license plate recognition software can be incorporated into each of the cameras 4, 8 and the cameras 4, 8 can do the license plate recognition (e.g. the cameras have their own processors and memory for storing and executing the license plate recognition software). In the alternative, the cameras 4, 8 can forward the imaged license plates to the controller 11 which stores the license plate recognition software 12. In addition, the point of sale station 3 receives the initial license plate information and correlates this information with the selected wash criteria and sends it to the controller 11 of each carwash tunnel 6.

What is unique about the use of license plate technology for organizing the queue is that each vehicle has a unique identifier that cannot be confused (e.g. no two vehicle license plates will be identical). In addition, the vehicle does not have to be continuously monitored as it progresses in the vehicle queue 9, rather it only need be identified at the initial point of sale station 3 and right before entry into the carwash tunnel 6. Therefore, only two cameras 4, 8 with access to license plate reading technology are necessary. The license plate information is sent to the point of sale station 3, which now combines the license plate information with the customer's wash order and the combined information is sent to the tunnel controller 11. In addition, the raw information can be directly sent to the tunnel controller 11 which can correlate the license information with the carwash information.

In addition, to obtaining the license plate number, the date, time, camera, location, lane or queue position, type, brand, model and color information can be forwarded to the tunnel controller 11. The tunnel controller 11 sets up the carwash tunnel 6 for washing the vehicle 2 based on the type, brand and model information obtained by the cameras 4, 8 as an optional feature. In this manner the machinery of the carwash tunnel 6 can be preset to manage individual vehicles. For example, the process of washing a pickup truck is different from that of washing a small sedan.

Throughout the application we refer to cameras 4, 8 as license plate readers. The application is not limited to camera-based license plate readers as sensors and scanners may also be used.

Figure 2:
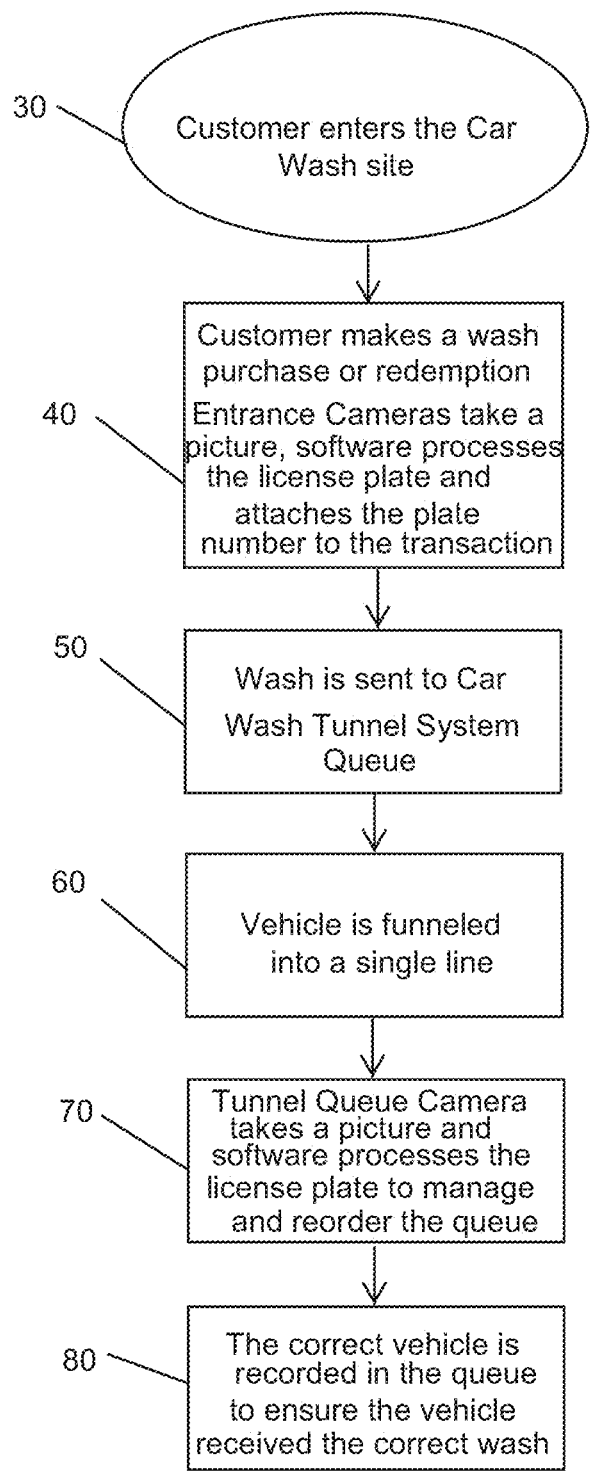
FIG. 2 is a flow chart for explaining a method according to the invention.

FIG. 2 is a flow chart for further explaining the invention. At step 30 a customer enters the carwash site. At step 40, the customer makes a carwash purchase or redemption. At the entrance, the camera 4 takes a picture of the of the license plate number and software processes the license plate number and attaches the license plate number to the transaction containing the desired wash services. At step 50, the vehicle 2 is sent to the vehicle queue 9. At step 60 the vehicle 2 is funneled into a single line for the carwash tunnel 6. At step 70, the tunnel queue camera 8 takes a picture of the vehicle license plate number right before it enters the carwash tunnel 6. Based on the license plate number taken by the second camera 8, the associated carwash information is obtained and this information sets up the carwash tunnel 6 to perform the desired services purchased by the customer. At step 80, the carwash queue of the tunnel controller 11 is reordered based on the next approaching vehicle 2.

As can be noted this system can work with one or more carwash tunnels 6 controlled by only one input area which may have one or a multiple of point of sale stations 3. In addition, vehicles 2 can be sent to a second carwash tunnel 10 and as the car enters the second carwash tunnel 10, its license plate is read and the correct carwash information is sent to the second carwash tunnel 10. In this manner a carwash may have multiple point of sale stations 3 and multiple carwash tunnels 6, 10.

Figure 3:
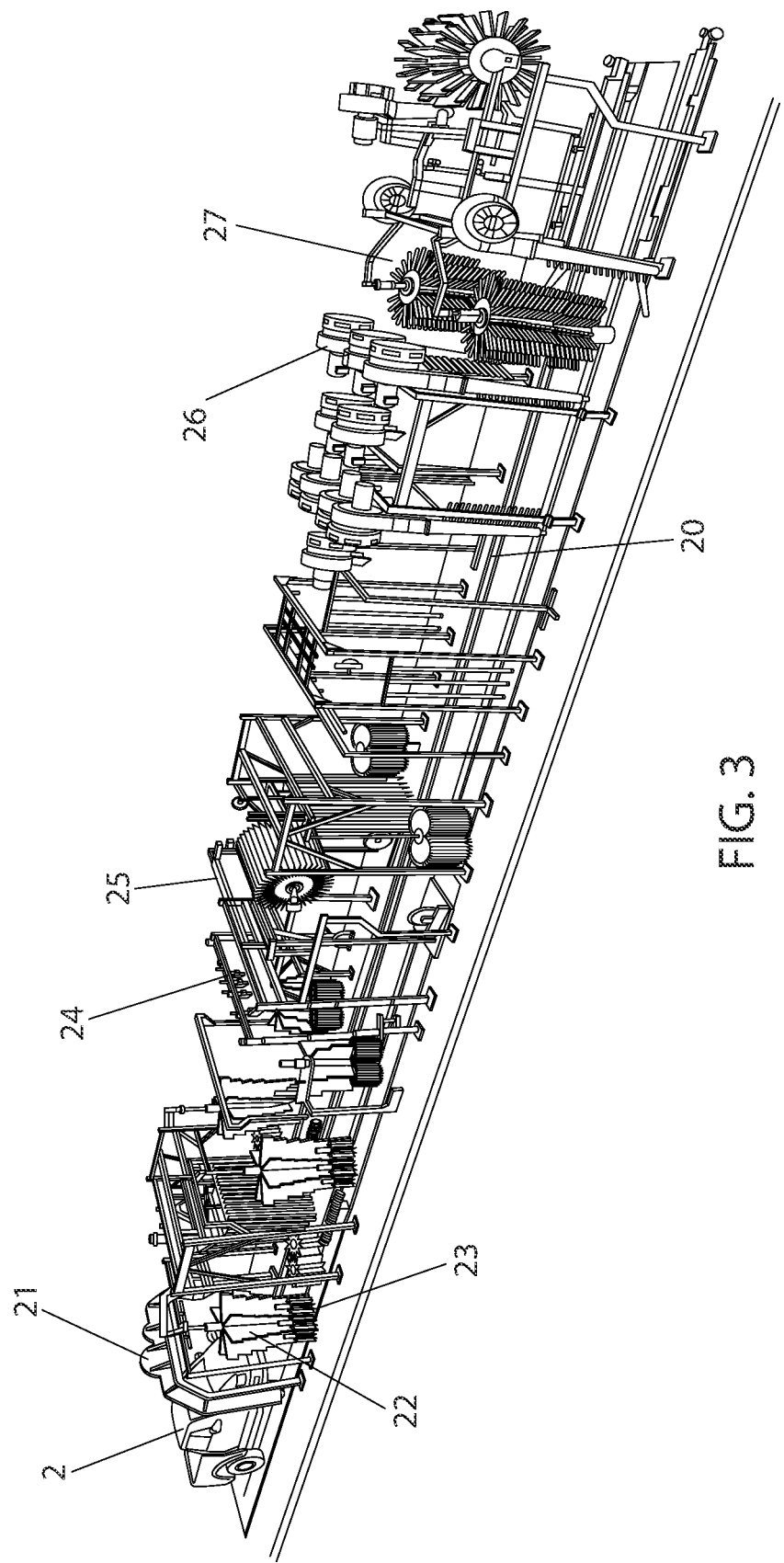
FIG. 3 is an illustration of a carwash tunnel.

FIG. 3 shows a simplified carwash tunnel 6, 10. The carwash tunnel 6, 10 has a conveyor 20 for moving the vehicle 2 to various stations of the carwash tunnel 6, 10. The carwash tunnel 6, 10 has an entrance arch 21 lighted with the confirmation of the selected carwash transaction. Then follows a pre-soak and underbody wash station(s) 22. This is followed by a friction washing with tire brush and side rocker brush station 23. Then comes the wash arch 24 and a top brush pendulum 25. After this comes the blower station 26 and the buff-n-dry wraps 27. All of these stations 21-27 can be preconfigured based on the requested carwash transaction and the type and dimensions of an entering vehicle.

The invention claimed is:

1. A carwash, comprising:
a point of sale station to be used by a carwash customer for purchasing a carwash transaction relating to a selected type of vehicle wash service;
a first camera disposed upstream of said point of sale station for reading a license plate number of a vehicle, said first camera connected to said point of sale station and the license plate number being associated with the carwash transaction and the selected type of wash service;
a carwash tunnel disposed downstream of said first camera and having a controller connected to at least one of said point of sale station or said first camera and receiving the license plate number and the carwash transaction;
a vehicle queue disposed between said point of sale station and said carwash tunnel, the vehicle entering said vehicle queue after completing a transaction at said point of sale station, the vehicle proceeding in the vehicle queue in an untracked manner; and
a second camera disposed upstream of said carwash tunnel, said second camera reading the license plate number of said vehicle at an end of said queue or in a region of an entrance to said carwash tunnel and forwarding the license plate number to said controller, said controller associating the license plate number taken by said second camera with the carwash transaction purchased and setting wash settings of said carwash tunnel to carry out the selected type of wash service.

2. The carwash according to claim 1, wherein said carwash tunnel washes the vehicle according to the carwash transaction.

3. The carwash according claim 1, wherein said point of sale station is one of a plurality of point of sale stations.

4. The carwash according claim 1, wherein:
said carwash tunnel has a controller connected to said second camera and at least one of said point of sales station or said first camera;
said controller receiving the carwash transaction and the license plate number from the point of sale station, said controller further receiving the license plate number from said second camera; and
said controller configuring a washing queue of said carwash tunnel based on the license plate number and the carwash transaction.

5. The carwash according claim 1, wherein said first camera and said second camera each store license plate recognition software and identify license plates of photographed vehicles.

6. The carwash according claim 1, wherein said carwash tunnel having a presoak station, a washing station and a drying station, parameters of said presoak station, said washing station and said drying station are set based on the carwash transaction.

7. A method of operating a carwash, which comprises the steps of:
driving a vehicle to a point of sale station of the carwash;
purchasing a carwash transaction relating to selected carwash services at the point of sale station;
reading a license plate number of the vehicle during the purchasing of the carwash transaction at the point of sale station;
sending the license plate number and the carwash transaction to a controller of a carwash tunnel;
combining the license plate number with the carwash transaction to form a carwash ticket;
sending the vehicle to a vehicle queue disposed downstream of the point of sale station, wherein the vehicle proceeds through the queue in an untracked manner;
reading the license plate number of the vehicle for a second time as the vehicle approaches an entrance to the carwash tunnel;
associating the license plate number read for the second time with the carwash ticket; and
the controller setting wash settings of the carwash tunnel to carry out washing of the vehicle according to a wash dictated by the carwash ticket.

8. The method according to claim 7, wherein the vehicle queue has a beginning, a middle and an end and the vehicle is only tracked once at the end of the vehicle queue or at an entrance to the carwash tunnel.

9. The method according to claim 7, which further comprises:
providing a plurality of point of sale stations; and
allowing vehicles to enter the vehicle queue in a random order from the point of sale stations and the vehicle being untracked until reaching a region immediately adjacent to the entrance of the carwash tunnel.

10. The method according to claim 7, which further comprises setting parameters of a presoak station, a washing station and a drying station all disposed in the carwash tunnel, the parameters being set are based on the carwash transaction.

11. A method of operating a carwash, which comprises the steps of:
driving a vehicle to one of a plurality of point of sale stations of the carwash;
purchasing a carwash transaction relating to selected carwash services at the one point of sale station;
taking a first image of a license plate number of the vehicle during a purchasing of the carwash transaction at the one point of sale station via a first camera;
associating the license plate number with the carwash transaction as a carwash ticket;
sending the license plate number and the carwash transaction to controllers of a plurality of carwash tunnels;

sending the vehicle to a vehicle queue disposed downstream of the one point of sale station, wherein the vehicle proceeds through the queue in an untracked manner;

taking a second image of the license plate number of the vehicle as the vehicle approaches an entrance to one of the carwash tunnels via a second camera;

associating the license plate number taken from the second image with the carwash ticket; and a corresponding controller setting wash settings of the one carwash tunnel to carry out washing of the vehicle according to a wash dictated by the carwash ticket in the one carwash tunnel.

12. The method according to claim 11, which further comprises allowing vehicles to enter the vehicle queue in a random order from the point of sale stations and the vehicles being untracked until reaching a region immediately adjacent to the entrance of an approaching carwash tunnel of the carwash tunnels.

13. The method according to claim 11, which further comprises setting parameters of a presoaking station, a washing station and a drying station all disposed in the one carwash tunnel, the parameters being set are based on the carwash transaction.

14. The method according to claim 11, which further comprising displaying in the one carwash tunnel the selected carwash services purchased in a visual manner to be observed by a customer entering the one carwash tunnel.

* * * * *